L. M. HICKEY.
CONDUIT REDUCER AND CONNECTOR.
APPLICATION FILED NOV. 29, 1916.
1,287,587.
Patented Dec. 10, 1918.
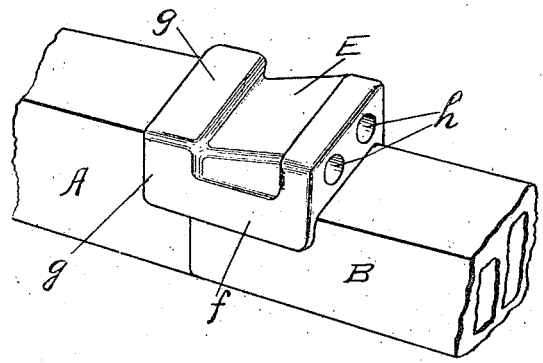
Fig. Nº 1
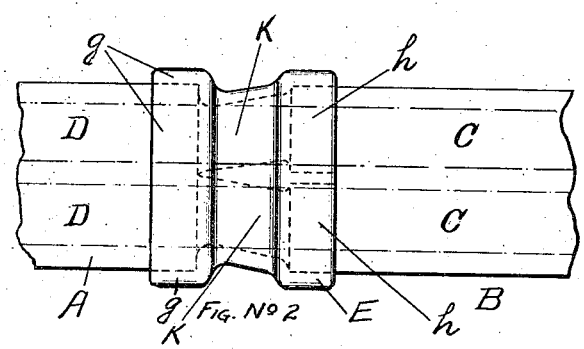
Fig. Nº 2
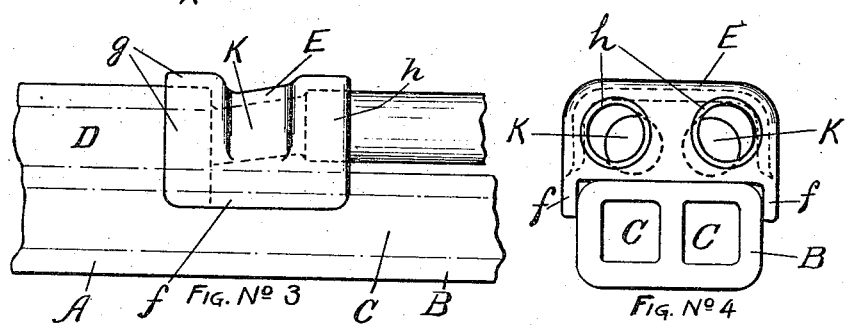
Fig. Nº 3
Fig. Nº 4
Witnesses
Raymond Krueger
Arnold Rause
Inventor
Leonard M. Hickey.
By Albert E. Smith.
Attorney

UNITED STATES PATENT OFFICE.

LEONARD M. HICKEY, OF MILWAUKEE, WISCONSIN, ASSIGNOR TO HENRY B. BURR, OF MILWAUKEE, WISCONSIN.

CONDUIT REDUCER AND CONNECTOR.

1,287,587.    Specification of Letters Patent.    Patented Dec. 10, 1918.

Application filed November 29, 1916. Serial No. 134,044.

*To all whom it may concern:*

Be it known that I, LEONARD M. HICKEY, a citizen of the United States, residing at Milwaukee, in the county of Milwaukee and State of Wisconsin, have invented a new and useful Improvement in Conduit Reducers and Connectors, of which the following is a specification.

My invention relates to improvements in conduits for underground wires such as telephone, lighting or power transmission wires or the like, and the objects of my invention are, to provide a connector by means of which conduits for branch wires are connected to the main line conduits, and to so construct this connector as to reduce the height of, and reduce the number of separate units built into, the main line conduit.

I attain these objects by the device, illustrated in the accompanying drawing, in which—

Figure 1 shows a perspective view of my device.

Fig. 2 is a plan view,

Fig. 3 is a side elevation and

Fig. 4 is an end elevation looking at Fig. 3 from the right hand side thereof.

Main line underground wires are contained in multiple pipe conduits extending uninterruptedly from one manhole to the next. The conduit may be a two, four, six or nine pipe conduit, according to the number of wires for which provision is made. The manholes are usually placed at street intersections. All the wires intended to connect with the buildings intermediate the manholes, usually branch from the main line at one convenient point as an alley intersection with the main line. These branch wires are contained in single hole round conduits for which the smallest size sewer pipe or drain tile are usually employed. These branch wires are most conveniently carried from the manhole to the branching point in two or three pipe square conduits on top of the main line conduit, and at the branching point these square conduits must be connected to the round branch conduits.

Referring now to the drawing, the conduit from the manhole to the branching point will be built, as illustrated, of four pipe tile sections A. From the branching point to the next manhole the conduit will be built as shown, of two pipe tile sections B. The main line wires that extend through from one manhole to the next are all placed in the lower tier of pipes C. C. The branch wires are all placed in the upper tier of pipes D. D. At the branching point I place my conduit reducer E. This reducer is conveniently made of cast iron. It is provided with the flanges *f. f.* embracing the conduit B and also the flanges *g. g.* embracing and overlying the conduit A. The reducer is also provided with the bell mouths *h. h.* in which the single opening round conduits are inserted and the apertures *k. k.* connecting the bell mouths *h. h.* with the conduit pipes D. D. are inclined to the horizontal as shown in Figs. 3 and 4 so as to bring the apertures *k. k.* fair with the conduit pipes D. D. The apertures *k. k.* also are inclined or spread laterally as shown in Figs. 2 and 4 to allow the two single conduits to be laid side by side and also to start them curving away from the main line.

The inclination of apertures *k. k.* to bring them fair with the conduit pipes D. D. is one of the essential features of my invention, as without this feature it is not practicable to use a four pipe conduit to carry both main line and branch line wires from the manhole to the branching point. The entire line of through wires from one manhole to the next would necessarily be carried in a two pipe conduit like B, and from the manhole to the branching point, the branch wires would have to be carried by a separate line of two pipe sections laid on top of the main line to bring the top tier of pipes fair with the level noninclined holes or apertures *k. k.* This would practically double the cost of the conduit from the manhole to the branching point, because a two pipe conduit section costs almost as much as a four pipe section and two separate two pipe sections would cost almost double the price of a single four pipe section. Also, where two separate lines of conduit are laid together it is necessary to connect them with cement plaster laid between them, and also to underlay them with a floor of concrete. We therefore have, where two separate lines of two pipe conduit are laid in place of a single line of four pipe conduit, an augmented cost due to additional digging, the concrete floor, the cement plaster between them, and the added cost of two two-pipe sections over one four pipe section.

While I have used for illustration of the advantage of my invention in reducing the cost of underground conduits, a main line two pipe section, the reduction in cost is equally substantial where the main or through lines are carried in a four or six pipe section and the main and branch wires together are carried in a six or nine pipe section respectively.

Having now fully described and ascertained the nature of my invention, what I claim is,

1. In a conduit combining throughway apertures and branch apertures, a conduit section containing throughway apertures below and branch apertures above, a second conduit section abutting thereagainst and having throughway apertures only registering with the throughway apertures of the first mentioned conduit section, a branch connector seated on the second conduit section and abutting against the end of the first mentioned conduit section with apertures therethrough registering with the branch apertures of the first mentioned conduit section, parallel flanges on the branch connector embracing the side walls of both conduit sections, and a top flange connecting the parallel flanges and resting on top of the first mentioned conduit section.

2. A branch connector for conduits, comprising a member adapted to rest on a conduit section and abut against a larger conduit section containing a greater number of apertures, said member being provided with apertures to register with the uppermost apertures of the larger conduit section, downwardly extending parallel flanges on said member embracing the smaller conduit section between them, end flanges at one end of the member forming continuations of the downwardly extending flanges for embracing the larger conduit section between them, and a top flange connecting the side flanges and resting on the larger conduit section.

3. A branch connector for connecting branch conduits with a conduit containing both straightway and branch apertures at the junction of the straightway conduit therewith, comprising a metal connector member seated on the straightway conduit and abutting against the end of the combination conduit with inclined diverging apertures therethrough registering with the branch apertures of the combination conduit, parallel side flanges on the connector member embracing the side walls of the straightway conduit and of the combination conduit, and a top flange connecting the side flanges and bearing on the top of the combination conduit.

In testimony whereof, I have hereunto set my hand this 23rd day of November, 1916, in the presence of witnesses.

LEONARD M. HICKEY.

Witnesses:
A. E. SMITH,
ARNOLD REUSS.

Copies of this patent may be obtained for five cents each, by addressing the "Commissioner of Patents, Washington, D. C."